United States Patent [19]

Liu

[11] Patent Number: 5,016,168
[45] Date of Patent: May 14, 1991

[54] METHOD FOR STORING INTO NON-EXCLUSIVE CACHE LINES IN MULTIPROCESSOR SYSTEMS

[75] Inventor: Lishing Liu, Pleasantville, N.Y.

[73] Assignee: International Business Machines Corporation, Armonk, N.Y.

[21] Appl. No.: 289,659

[22] Filed: Dec. 23, 1988

[51] Int. Cl.$^5$ .................. G06F 9/312; G06F 15/16; G06F 12/08; G06F 9/46

[52] U.S. Cl. .................. 364/200; 364/228.3; 364/243.4; 364/243.41; 364/265.3; 364/266.3; 364/931.4; 364/943.9; 364/945.6; 364/948; 364/957.5; 364/957.6; 364/961.2; 364/254.2; 364/254.5; 364/256.2

[58] Field of Search ... 364/200 MS File, 900 MS File

[56] References Cited

U.S. PATENT DOCUMENTS

| | | | |
|---|---|---|---|
| 4,394,731 | 7/1983 | Flusche et al. | 364/200 |
| 4,484,267 | 11/1984 | Fletcher | 364/200 |
| 4,775,955 | 10/1988 | Liu | 364/900 |
| 4,797,814 | 1/1989 | Brenza | 364/200 |
| 4,925,225 | 5/1990 | McCarthy et al. | 364/200 |

Primary Examiner—Archie E. Williams, Jr.
Assistant Examiner—Ayni Mohamed
Attorney, Agent, or Firm—Terry J. Ilardi; Ronald L. Drumheller

[57] ABSTRACT

A method for storing into a non-EX cache line in a multiprocessor system. Upon a store into a non-EX line the instruction execution and the processing of subsequent instructions will continue. The results of the current instruction, however, and any subsequent instruction whose decode and execution depends upon the result of the current instruction or that requires operand fetches, will not be released until the processing of the current instruction is resolved. The request to store into the non-EX line is simultaneously sent to the SCE to obtain the EX state for the line. The SCE serializes storage requests. When a request for EX state is processed, certain XI actions (e.g. XI-invalidates) may be invoked. Any instruction using fetched data XI-invalidated before the resolution of a preceding store at the same CP is considered likely to be invalid, and redone.

1 Claim, 14 Drawing Sheets

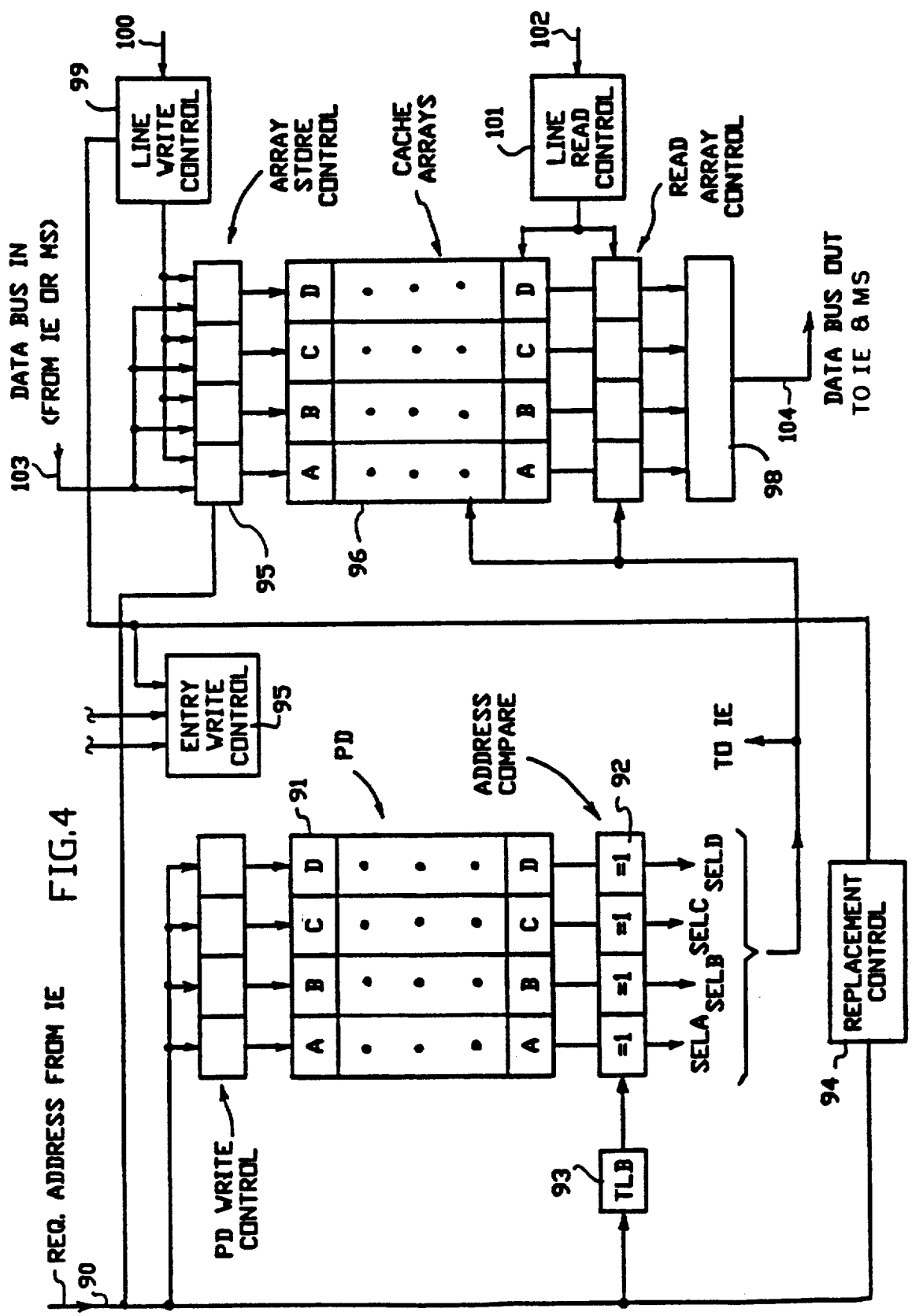

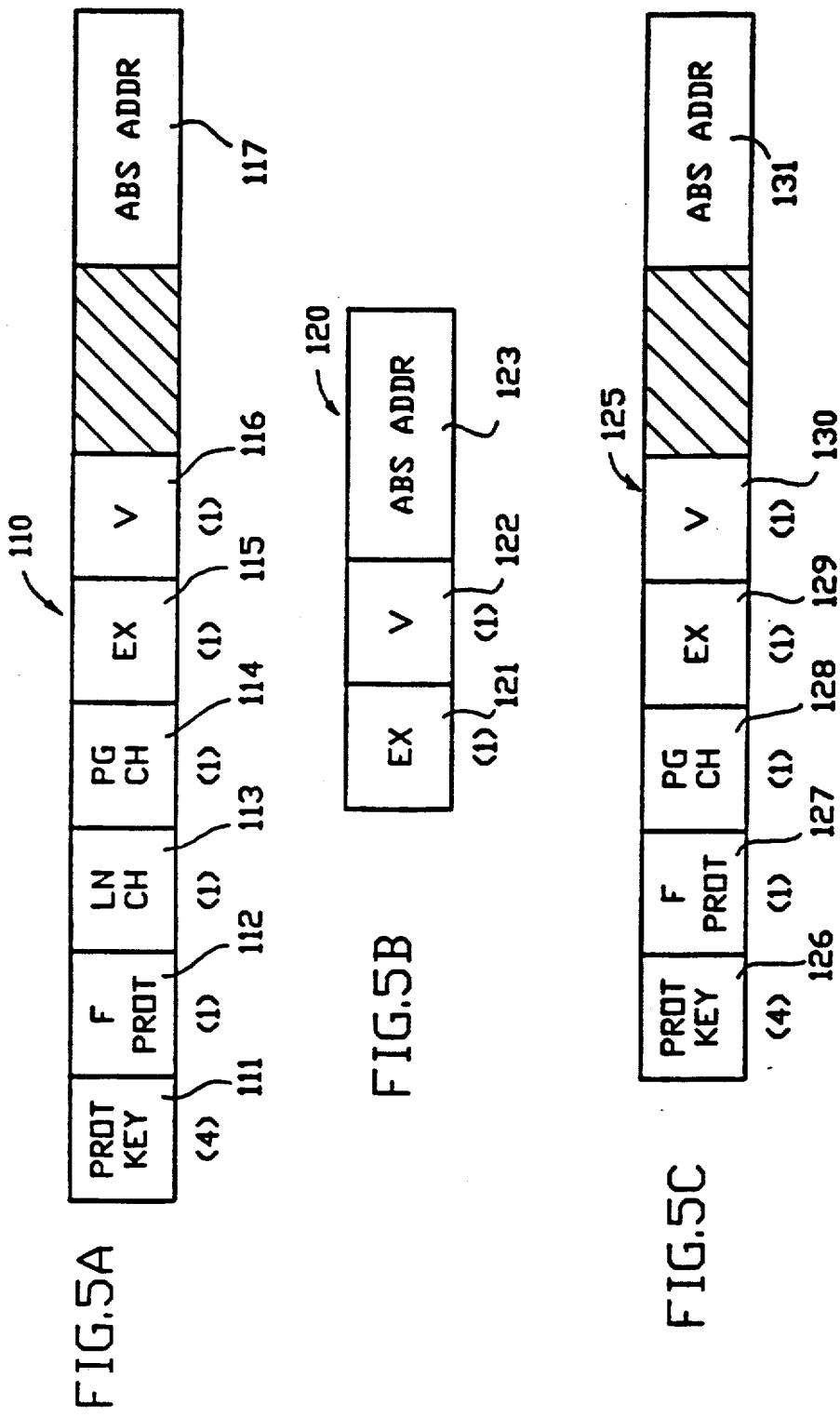

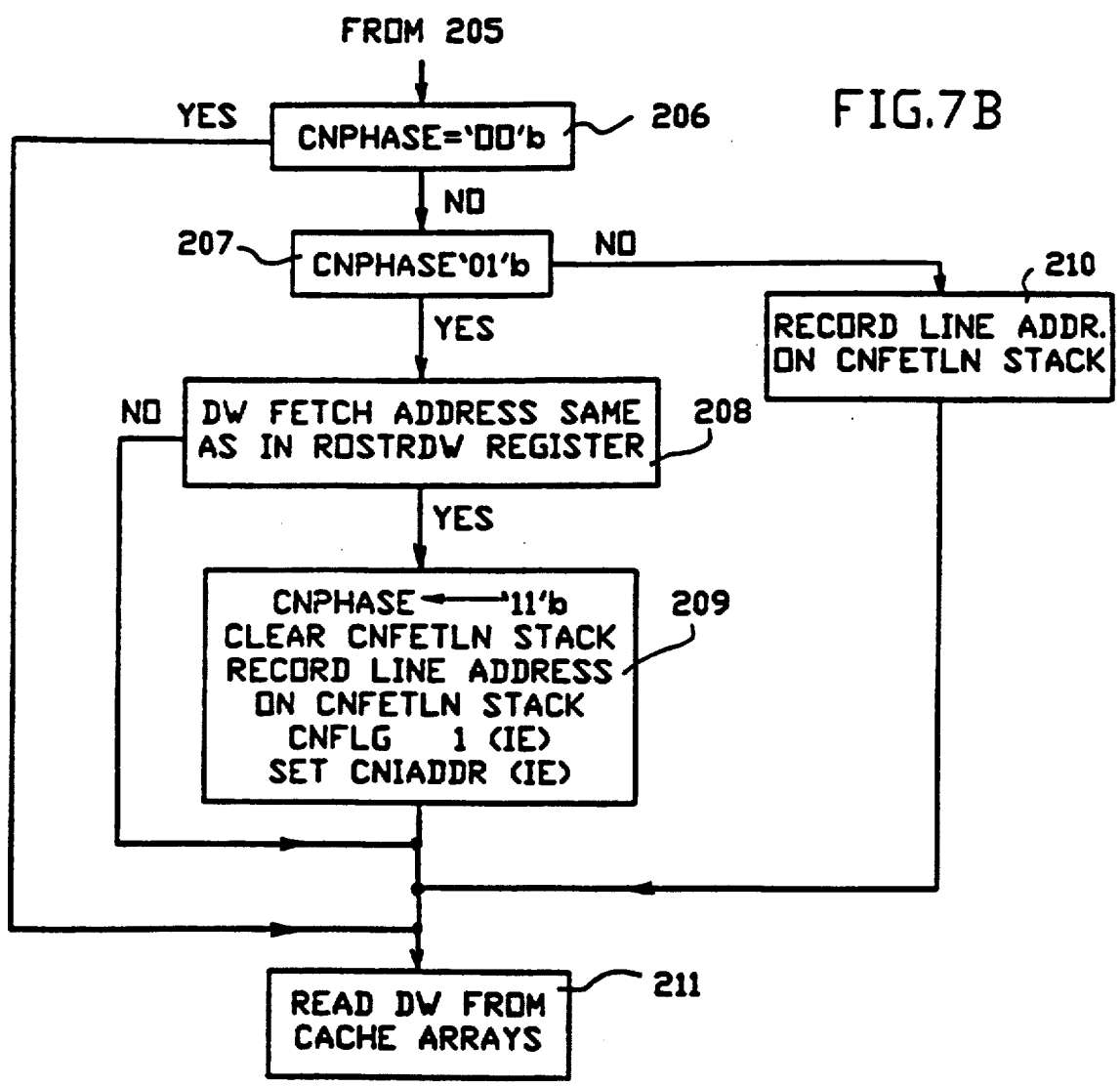

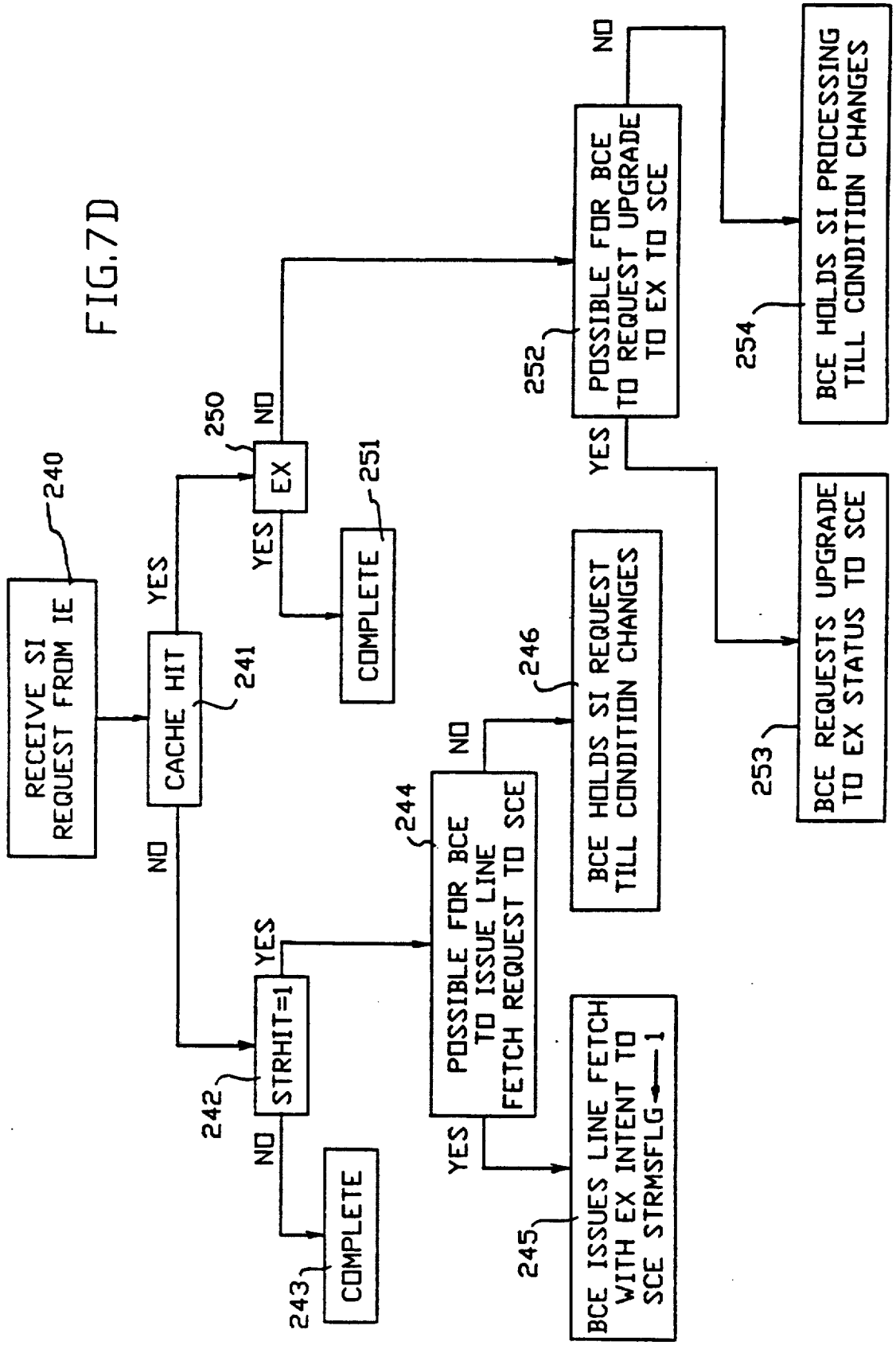

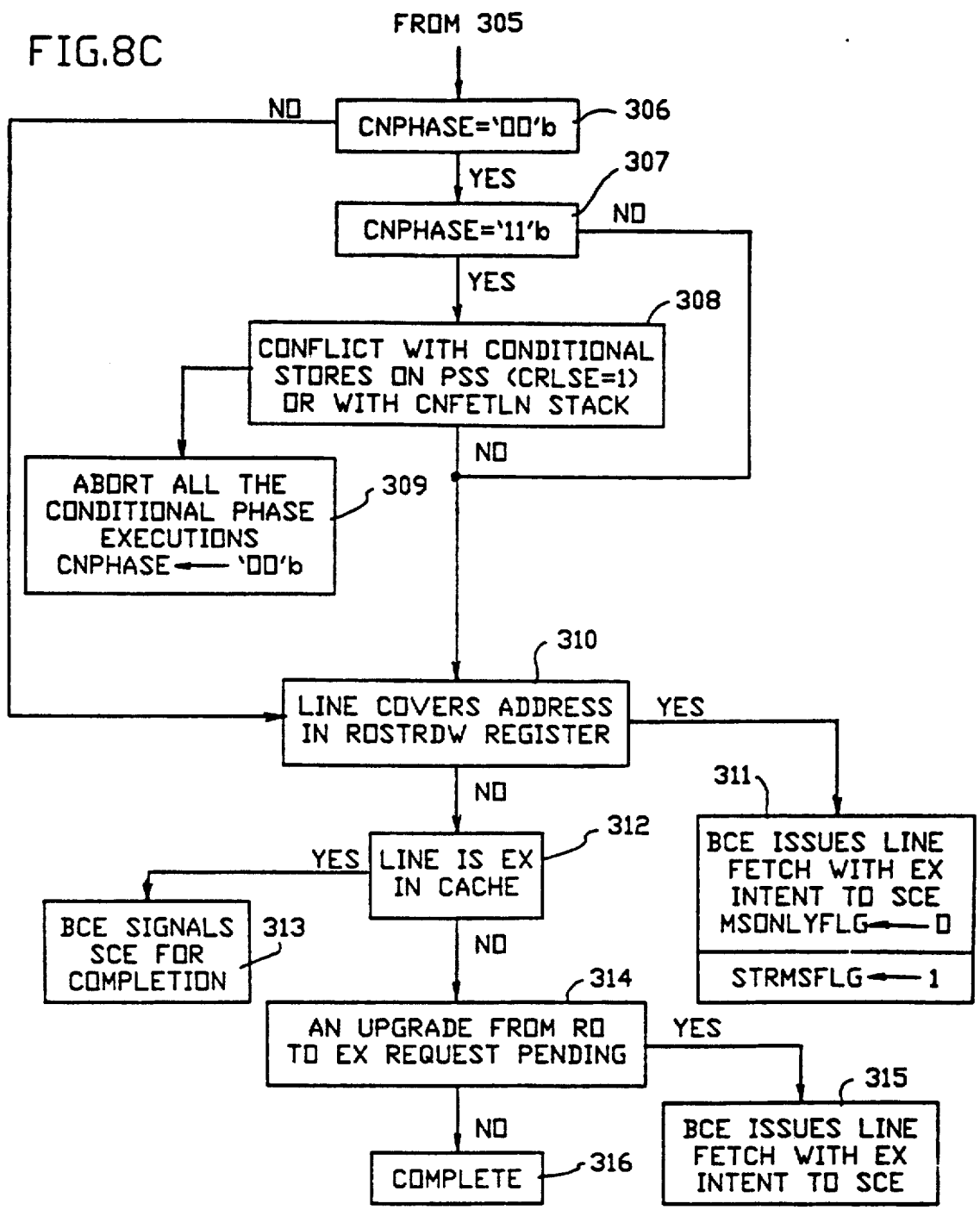

METHOD FOR STORING INTO NON-EXCLUSIVE CACHE LINES IN MULTIPROCESSOR SYSTEMS

BACKGROUND OF THE INVENTION

1. Field of the Invention

The invention relates generally to caches in a multiprocessor environment and more particularly to a method for fetching lines of data from a cache that are potentially dirty.

2. Description of the Prior Art

Modern high performance stored program digital computers conventionally fetch instructions and data from main memory and store the fetched instructions and data in a cache memory. A cache is a local memory that is typically much smaller and much faster than the main memory of the computer. Virtually all high performance digital computers use a cache and even some commercially available microprocessors have local caches.

Caches were developed because it has not been possible to build extremely large memories at a reasonable cost that operate having an access time commensurate with modern day pipelined processors. It is, however, possible to build less expensive, small memories that can keep up with the processor. Since an instruction and its needed data in the cache can be immediately accessed by the processor, caches usually speed up computer performance.

Normally a processor (CP) accesses main storage (MS) data through its cache. A cache is usually organized as a 2-dimensional array, in which each array entry contains a fixed size block of MS data called a line. The directory of a cache describes the addressing information for its lines. When an instruction or data accessed by the CP is found in the cache via directory lookup, the access is said to hit the cache. Otherwise the access misses in the cache. Upon a cache miss the cache control will generate a request to move the requested line into the cache. When a line is inserted into the cache it may replace an existing line. A cache is normally managed with certain replacement strategies such as the well known Least-Recently-Used (LRU) replacement algorithm. Depending on the cache design, the replacement of a line from cache may require update of the replaced contents to MS in order to maintain consistency of the storage.

Caches can be used in both multiprocessor and uniprocessor systems. In the type of multiprocessor (MP) system known as the tightly coupled multiprocessor system in which several CPs have their own caches that share a common operating system and memory, additional problems arise since it is necessary for each processor's cache to know what has happened to lines that may be in several caches simultaneously. In a multiprocessor system where there are many CPs sharing the same main storage, each CP is required to obtain the most recently updated version of data according to architecture specifications when access is issued. This requirement necessitates constant monitoring of data consistency among caches, often known as the cache coherence problem.

There are various types of caches in prior art multiprocessor systems. One type of cache is the store through (ST) cache as described in U.S. Pat. No. 4,142,234 assigned to the assignee of the present invention. Such a cache may be found in the IBM System/370 Model 3033 MP. ST cache design does not interfere with the CP storing data directly to the main storage (or second level cache) in order to always update changes of data to main storage. Upon the update of a store through to main storage appropriate cross invalidate actions may take place to invalidate possible remote copies of the stored cache line. The storage control element (SCE) maintains proper store stacks to queue the MS store requests and standard communications between a buffer control element (BCE) and the SCE will avoid store stack overflow conditions. When the SCE store stack becomes full the associated BCE will hold its MS stores until the condition is cleared.

Another type of cache design is the store-in cache (SIC). SICs are described in U.S. Pat. Nos. 3,735,360 to Anderson et al. and 3,771,137 to Warner et al. A SIC cache directory is also described in detail in U.S. Pat. No. 4,394,731 to Flusche et al. in which each line in a store-in cache has its multiprocessor shareability controlled by an exclusive/read only (EX/RO) flag bit. The main difference between ST and SIC caches is that, all stores in SIC are directed to the cache itself (which may cause a cache miss if the stored line is not in the SIC cache). It is also proposed in U.S. Pat. No. 4,503,497 that data transfers upon a miss fetch can take place through a cache to cache transfer bus (CTC) if a copy is in the remote cache. A SCE is used that contains copies of the directories in each cache. This permits cross interrogate (XI) decisions to be resolved at the SCE. Usually cache line modifications are updated to main storage only when the lines are replaced from the cache.

A cache line that is RO is valid only in a read only state. The processor can only fetch from the line. Stores into the line are prohibited. A RO cache line may be shared simultaneously among different caches.

A cache line that is EX is valid but only appears in the cache of one processor. It is not resident in any other (remote) cache. Only the (owning) processor is allowed to store into the line.

A cache line that is CH indicates that not only is the line valid and EX but that it has been stored into (i.e., CHanged). That is the copy in main storage may not be up to date. When a CH line is replaced a copy is sent to main storage via a castout action.

An INV cache line is a line that is invalid.

In a typical computer system a first CP, $P_1$, may access an instruction or data from a line in a cache. Its own cache will be checked and if the particular line requested is read only (RO) it may make a store request, and via the storage control element (SCE), make that line exclusive (EX). Once the line is made exclusive, the storage control element (SCE) indicates to the other caches that the line is invalid and the first cache will be free to write into that line.

In the multiprocessor cache environment a problem known as the Cross-Interrogate (XI) problem occurs as a result of relatively close accesses of the same data line by different processors (CP's). For instance, if a line is modified by CP $P_1$ other CP's may fetch a dirty copy of a line L if line L is fetched from memory before the modifications by f.P sub 1 are updated to the memory.

For illustration purposes, in the following a multiprocessor system is considered in which there are N CP's $\{P_i | 1 \leq i \geq N\}$ and a private cache $C_i$ for each $P_i$. For purposes of the present discussion a memory hierarchy in which shared main memory is the one below private caches is assumed.

One major problem with ST cache design is the traffic generated by all CPs in the system. A trend, however, in future MP systems is the availability of high performance shared storage among all processors. An example of such fast shared storage is the shared second level cache (L2). With the provision of such high performance shared storage it becomes attractive to implement MP systems with ST caches while still supporting more CPs. Yet another problem with ST design is the busy store handshaking with SCE problem as illustrated in U.S. Pat. No. 4,142,234. In such a design the data item being stored by a CP cannot be fetched by the same CP till the CP receives acknowledgement of the store from the SCE. Such busy handshake not only slows down the processor pipeline operation but also makes it difficult for the SCE to efficiently serialize all the stores when there are more CPs.

One known approach to the busy store handshake problem for ST design is to employ the EX/RO states from SIC design. Consider a store-thru cache MP environment in which at any moment, a cache line may have any one of the three states INV, RO or EX. INV indicates invalidity. RO indicates the possibility of simultaneous access of different copies of the line from more than one CP. EX guarantees that no other cache can have a copy of the line for access. A typical implementation of this multiprocessor cache scheme is as follows. Upon the fetch of a line L the line is brought into the cache with either RO or EX state (depending on the particular instance and the particular cache scheme). When, however, a store is requested on a line, the system should guarantee the EX state to the line before the line can be stored into. This granting of the EX state may involve XI actions to invalidate copies of the line from other caches. When a CP, for example, $P_1$, stores into a line L held RO in its local cache, its buffer control element (BCE) will request EX status for L before the store can be putaway into the cache. In a typical MP system, for example, the one described in U.S. Pat. Nos. 4,394,731 and 4,503,497, the cache is blocked from subsequent accesses till the EX status is acquired in order to guarantee data coherence. In certain MP designs, such holding of cache access upon EX status request causes significant performance penalties.

The primary reason, in more conventional MP designs, to prevent subsequent cache accesses at a CP when its BCE is waiting for EX status of a line is due to the consideration that a subsequent fetch may become obsolete due to a store invalidate from remote CP. For example, consider an instruction stream $<..I_i...I_j>$ at a CP. Assume that $I_i$ triggers a EX status request for a line L, and assume that $I_j$ fetches a doubleword A before the EX status is acquired for L. If, by the time EX status is acquired on L for the store from $I_i$ the line containing A is invalidated due to a store from a remote processor, the execution of $I_j$ may cause architecture violation due to its access of A. From workload analysis it has been observed that, in a typical design in which EX status can be acquired reasonably quickly, the chance for a CP to use remotely invalidated data during the window for EX status acquisition is rather slim. As a result, preventing a cache from being accessed while a CP is acquiring EX status of a line will most likely hold the CP execution unnecessarily and unproductively.

Another known technique in modern processor design is conditional instruction execution based on branch prediction. With such design instruction streams may be fetched for decode and execution based on prediction of branch instruction outcome. In case instructions are initiated incorrectly based on wrong prediction they can be aborted later. Prior to the confirmation of an instruction, any store request resulting from the conditional execution will be held in a Pending Store Stack (PSS) for final release upon finish. Both instruction finishes and pending store releases are done in the order of architectural sequence, although instructions may be executed out of incoming sequence prior to completion. When a conditional instruction stream is aborted all the relevant instruction queue and pending stores in PSS are reset properly.

There is no known art directed to minimizing the delays caused by EX status acquisition through anticipatory subsequent data access. All known methods of MP cache design allow a CP to access a cache line only when there is no pending EX status request. Before an ongoing EX status request is complete, the CP cache is prevented from being accessed.

SUMMARY OF THE INVENTION

In accordance with a preferred but nonetheless illustrative embodiment demonstrating objects and features of the present invention there is provided a capability to let a CP access its cache before a EX status request is complete. As a result, in relatively few occasions, a line accessed by a CP upon EX status acquisition may turn out to be dirty and cause proper instructions to be backed up. This has significant advantages on performance since it avoids most of the CP execution disruptions associated with EX status requests.

The present invention utilizes an MP system with an ST cache design and SIC type cache coherence management with EX/RO states. A relatively fast MS or shared L2 is assumed. Upon EX request situation, the fetch and/or use of operand data is allowed before the CP receives the requested EX status for a RO line. Before such EX status is acquired, any subsequent operand access may be determined as invalid. Whenever a line having uncertain validity is used by a CP the results of execution of the instructions depending on the validity of the line should not be committed to the outside till the validity is justified. If, however, an instruction is determined to have used dirty data, all operations performed based on the dirty data should be aborted and restarted properly.

The way the BCE determines the validity of conditionally fetched operand upon EX status acquisition is through monitoring remote invalidate signals. A conditionally fetched operand is considered dirty if it is covered by a remotely invalidated cache line before the EX status from the local CP is resolved. The BCE of a CP should remember the status of conditional execution and the operand fetches issued during conditional phase.

Accordingly it is an object of the invention to provide a method for early fetching cache lines to overcome the performance problem due to EX status acquisition.

It is another object of the invention to avoid unnecessary delays in the execution of instructions;

It is still another object of the invention to allow cache lines to be used prior to the determination of their validity.

These, and other, objects, advantages, and features of the invention will be more apparent upon reference to the description and the appended drawings.

BRIEF DESCRIPTION OF THE DRAWINGS

FIG. 4 shows a typical cache control within a BCE;

FIGS. 5A and 5B illustrate the formats for the processor directory, and cache directory entries, respectively;

FIG. 5C shows a modified format for a processor directory entry;

FIGS. 7A and 7B are flowcharts showing BCE handling upon receiving a fetch request with RO intent from the IE unit;

FIG. 7D contains a flowchart for BCE handling upon receiving a store interrogate (SI) request from the IE unit;

FIGS. 8B and 8C shows the BCE actions upon receiving a line invalidate request from the SCE; and FIG. 9 shows an alternative method for the BCE to monitor potentially dirty operand fetches during conditional executions.

DESCRIPTION OF THE PREFERRED EMBODIMENTS

Figure 1:
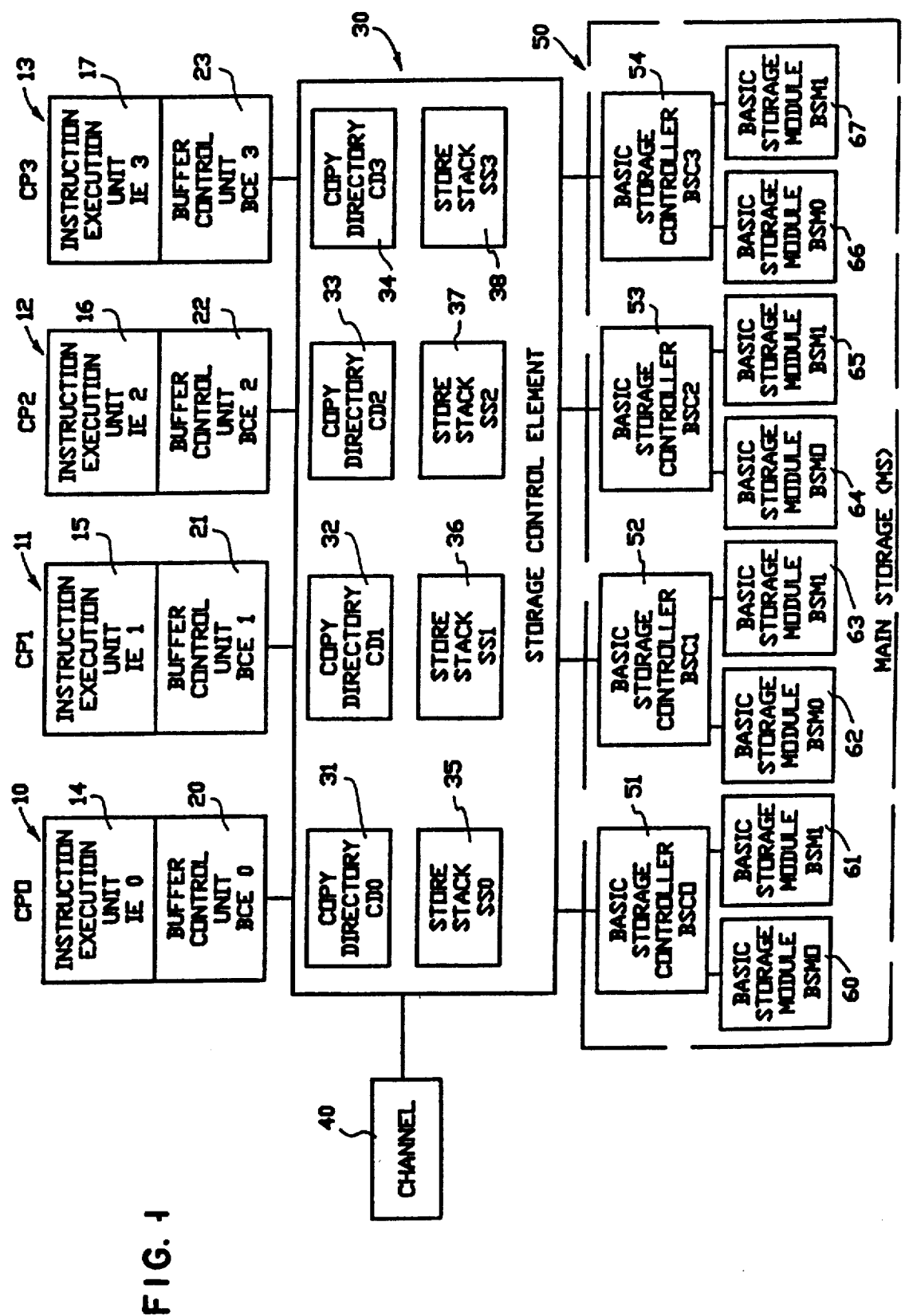
FIG. 1 shows a multiprocessing system in which the present invention may be used.

FIG. 1 represents a multiprocessing (MP) system in which the present invention may be used. The MP comprises four central processors (CP's) CP0 through CP3 (10, 11, 12 and 13), in which each CP includes an instruction execution (IE) unit (14, 15, 16 and 17) and a buffer control unit (BCE) 20, 21, 22 and 23, respectively. Each IE includes hardware and microcode that issue instructions that require the fetching and storing of operands in main storage (MS) 50.

IEs (14-17) begins a fetching or storing operation by issuing a fetch or store command to its respective cache controls (BCE) 20-23, which include a processor store-thru (ST) cache with its associated processor cache directory (PD) 82 and all processor cache controls which are exclusively used by the associated CPs (10-13). The CP generally issues a fetch or store command for each doubleword (DW) unit required by an operand. For some of the store requests from IE unit, a contiguous piece of data within a doubleword may be specified. For instance, a store into a byte may be requested to the BCE. Such stores to a subset of a doubleword are called partial (DW) stores. If the cache line containing the DW is in the PD, which is a cache hit situation, the DW is fetched or stored in the cache in accordance with the command. Occasionally the required DW is not in the cache, which results in a cache miss.

Before the IE fetch command can be completed, the line containing the DW must be first fetched into the cache from the main storage. To do this, the BCE generates a corresponding fetch miss command which requests the storage control element (SCE) 30 to obtain a line unit of data having the DW required by the IE from main storage 50. The line unit will be located in the main storage 50 on a line boundary, but the required DW will be the first DW in the fetched line to be returned to the requesting BCE (20-23) in order to keep the IE request going before the completion of the missed line transfer.

In this particular embodiment, the IE is not always required for the IE store to have the line resident in its cache. In the store-thru cache design in IBM/370 Model 3033 systems, a store from IE unit may be sent to the MS directly if the line is not found in the cache for the issuing CP. One disadvantage of doing so is the requirement of partial merge facility at the main storage BSM's (60-67). For instance, assume that a store is putaway into MS 50 with error correcting code (ECC) generated on DW basis. A partial doubleword store at MS 50 will require the regeneration of ECC through data merging before it can be putaway into the MS arrays. In the described embodiment it is assumed that all partial merges are done at the cache controls. Hence, a partial DW store will always require the line to be resident at the cache of the issuing CP. A full DW store, however, from the IE may be sent to SCE 30 for MS putaway without triggering a line miss fetch if the line is not in the CP cache. In any event, it is assumed that the IE unit sets the MSONLY bit whether a store should be put into cache when the store is sent to the BCE.

SCE 30 connects to the CPs 10-13 and main storage 50. Main storage 50 is comprised of a plurality of basic storage module (BSM) controllers BSC0 thru BSC3 (51, 52, 53 and 54, respectively) in which each basic storage controller (BSC) 51-54 connects to two BSMs, 0 (60, 62, 64 and 66) and 1 (61, 63, 65, and 67). The four BSCs 0-3 (51-54) are each connected to SCE 30.

SCE 30 contains four copy directories (CDs) 31, 32, 33, and 34. Each CD contains an image of the contents of a corresponding processor cache directory (PD) in one of the BCEs in a manner similar to that described in Flusche et al, U.S. Pat. No. 4,394,731. Both PD and CD are addressed by the same bit positions from the logical address. The CDs handle all cross-interrogate (XI) requests and can thereby better service their respective CPs. A doubleword wide bidirectional data bus is provided between each BSM 60-67 in main storage and each SCE port, and from each SCE 30 to each CP and I/O channel controller processor 40. Along with the data busses there are also separate sets of command bus for control and address signals. When a CP encounters cache miss for a DW access request, its BCE 20-23 initiates a line access request to main storage by sending a miss command to SCE 30, which then reissues the command to a required BSM 60-67 in main storage. In the event of a BSM busy condition, SCE 30 will save the request in a command queue and will reissue it at a later time when the required BSM 60-67 becomes available. SCE 30 also sequences the main storage commands in an orderly fashion so that all commands to a particular BSM are issued in first-in-first-out (FIFO) order, except when a cache conflict is found by its XI logic. During the normal sequence of handling a main storage request, SCE 30 constantly monitors the status of main storage, analyzes the interrogation results of protection key and all cache directories, examines updated status of all pending commands currently being held in SCE 30, and also looks for any new BCE commands that may be waiting in BCE 20-23 to be received by SCE 30.

SCE 30 maintains a plurality of store stacks SS0 through SS3 (35-38), each for the holding of main storage store requests of up to 16 DWs for a corresponding CP. SCE 30 keeps enough directory information for the store stacks for the indication of main storage addresses and validity. When a store stack risks overflow SCE 30 sends a priority request to the associated BCE 20-23 to hold the sending of more store requests till the BCE 20-23 receives a later signal from SCE 30 clearing the store stack full condition. Data in the store stacks are updated to main storage with appropriate scheduling maintaining the incoming order within each store stack. A line fetch request from a CP is held by SCE 30 till the SCE makes sure that all existing stores to the line in the store stacks have been sent to the associated BSM 60-67.

Figure 2:
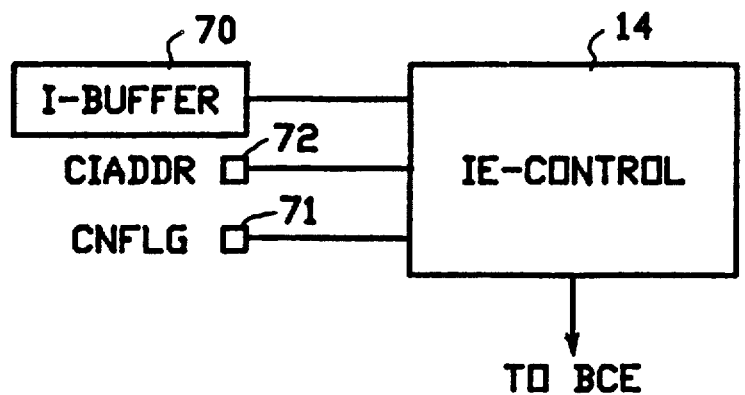
FIG. 2 shows the background organization of instruction control at an IE unit.

FIG. 2 shows the background organization of the instruction control at the IE unit for each CP. The IE at each CP has the capability of executing instructions on conditional basis. Branch prediction may be employed, although not required. For the purposes of explanation herein, the present description has been simplified to assume that the only cause for conditional execution is due to fetching potentially dirty data when the BCE is waiting for EX status on a line from SCE, although the control of conditional execution bears much resemblance to that for branch prediction machines. In particular, when an execution is backed up, the IE unit can reset the machine status (registers) to the point before the execution was started. There is an instruction buffer (IBUF) 70 containing 16 halfwords. Note that in the IBM 370 architecture each halfword (HW) is two bytes long and each instruction code can be of length between 1 to 3 halfwords.

In order to simplify the embodiment of the invention insequence serial execution only is assumed, although the concept of the invention does not preclude more complex implementations for out-of-sequence executions. Instructions are executed only according the logical sequence in the instruction stream, including the conditionally executed instructions. Operand fetches and stores are carried out only according to the logical sequence. The IE unit maintains a single flag register CNFLG 71 indicating whether the currently executed instruction is conditional. The IE also maintains a register CNIADDR 72. Under the conditional execution phase, with CNFLG=1, CNIADDR holds the address of the instruction that first initiated the conditional fetch of data from main storage.

Figure 3:
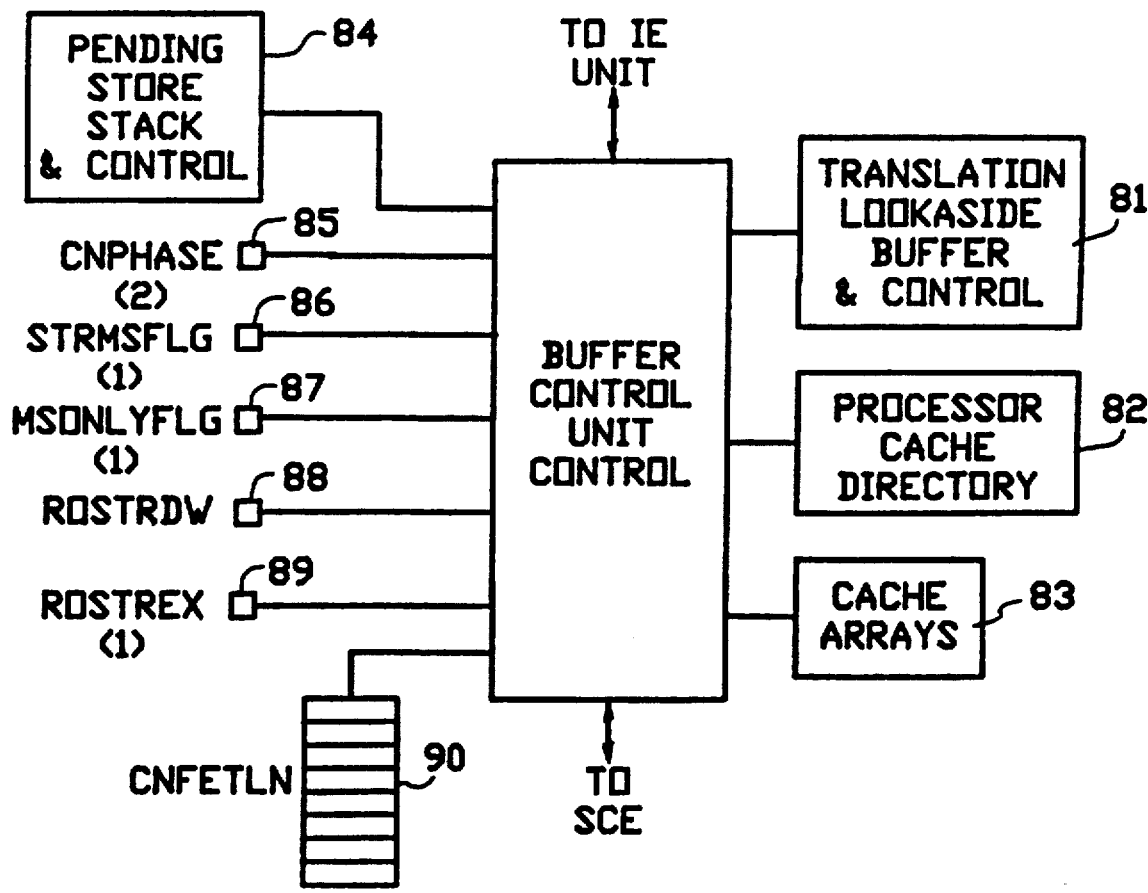
FIG. 3 shows the overall organization of a BCE.

FIG. 3 shows the overall organization of a BCE, for example, 20. The BCE maintains, via BCE control 80, translation lookaside buffer (TLB) for the translation of logical main storage access addresses to real addresses, via TLB control 81. Processor Cache Directory (PD) 82 is the processor cache directory. Cache arrays 83 contain the actual cache data. The pending store stack (PSS) 84 has 8 entries. PSS 84 is used to hold DW stores from IE execution that have not yet been sent out to cache and main storage. The BCE control maintains a flag CNPHASE (2 bits) 85 indicating whether there is a potentially dirty cache line fetches at the moment. When CNPHASE is '00'b (with both bits 0) there is no store activity going on with RO line involved. When CNPHASE is '01'b there is a (doubleword) store putaway into a RO line in the cache. When CNPHASE equals '11'b, not only is there such a store put away into a RO line in cache, but also the early put away store has been fetched as an operand, which is subject to abort if invalidated later. The BCE also maintains an address register ROSTRDW 88 recording the doubleword address for a data store that has possibly been put away into a RO line in the cache when CNPHASE≠'00'b.

The BCE also maintains a stack directory CNFETLN 90 with 8 entries recording the real addresses of lines that the IE has fetched operands from conditionally. When CNPHASE='11'b the BCE uses CNFETLN 90 stack to determine whether dirty data have been used in conditional phase upon receiving a line invalidate signal from the SCE. The BCE also maintains a flag indicating overflow condition for CNFETLN 90. When a line address is to be recorded in CNFETLN stack, the address is pushed to the stack if it is not already there. When CNFETLN 90 is full upon an insertion the overflow flag is set and no insertion will take place. In addition, the BCE maintains a flag bit MSONLYFLG (1 bit) 87 for certain purposes described later on. MSONLYFLG 87 is initialized and remains 0 in normal circumstances.

FIG. 4 shows a typical cache control 80 within a BCE (20, for example), similar to the descriptions of U.S. Pat. No. 4,484,267. The fetch or store request address (logical or real) from the IE at is used to select a congruence class from the processor cache directory (PD) 91. In the described 4-way set-associative cache design there are 4 directory entries A-D read out from the selected congruence class. The absolute line addresses recorded at these 4 PD entries A-D are compared at address compare 92 with the absolute request address obtained from the address translation facility 93. These addresses are compared to determine whether the line is missing in the cache or which of the 4 lines this access hits, as indicated by the SELA, SELB, SELC, and SELD signals. The results of the address compares are passed to both the IE unit and the array control. The replacement control 94 maintains the replacement status arrays, updates these status arrays when necessary, and selects the line entry to be replaced when a new line is fetched from MS. The PD entry write control 95 controls the update of PD entries. For a DW fetch request, in parallel to the PD read and translation processes, 4 DWs A-D in the selected congruence class are read out of the array for late select array read control 97 when the directory address compare 92 is done. As determined by control 98, a DW data is read out at 104 to either the IE unit or the MS as needed.

As described in U.S. Pat. No. 4,394,731 a DW store from the IE is preceded with a store interrogate (SI) request during an earlier cycle. The SI request will make sure that the store can be done without a conflict such as a key violation, cache miss or absence of EX status. After the SI cycle, the actual DW store may be issued by the IE with direct putaway into the correct array position if there is no other reason for delay. In this embodiment it is also assumed that the SI request from the IE to BCE also includes a flag bit indicating whether the associated DW store is partial or not. It is further assumed that conventional techniques described in U.S. Pat. No. 4,394,731 are used in which a number of registers are used to record those stores that have been test by SI requests but whose actual store data are not yet sent to the BCE, so that the IE operand fetch requests may be held properly without missing earlier overlapping stores.

In the current embodiment CP operations are not necessarily held if the line is either missing in the cache or is resident with RO status. When an EX status is indeed necessary for the associated store putaway the BCE will prepare for conditional execution phase, when possible. The arrays 96 are updated under the control of line write control 99 and array store control 95 either by line or doubleword granularity, with the capability of partial DW putaway. The data for array store comes at 103 from either the IE or the main storage. Only parity bit per byte is required at the cache for data protection.

FIGS. 5A and 5B provide the formats for PD (110) and CD (120) entries respectively, similar to that described in U.S. Pat. No. 4,394,731. V (116, 122) is the valid bit for the directory entry. A valid line is in exclusive (EX) state if the associated EX bit (115, 121) is 1, and is in read only (RO) state otherwise.

Each PD line entry additionally contains a protect key (PROT KEY) 111, a line change (LC CH) bit 113, a fetch protect (F PROT) bit 112 and a page change (PG CH) bit 114.

A CD at the SCE is maintained as a mirror image for the PD at the corresponding BCE the same way as described in U.S. Pat. No. 4,394,731. The contents (EX, V and ABS ADDR 117 and 123) of a CD entry should be identical to those at the corresponding PD entry except during a transition phase for a status change. Note that, since with our ST cache design all CP stores to cache will be reflected at the MS, there is no need for the LN/CH (line changed) field (113) at the PD entry which indicates whether the cache line is holding data not scheduled to be sent to MS. FIG. 5C contains the modified format (125) for a PD entry.

With ST design the castout command from BCE to SCE is eliminated. A castout for SIC design, as described in U.S. Pat. No. 4,394,731, causes a changed line in a SIC to be updated at the main storage through SCE 30. With an ST design the castout command is replaced with a DW store command, with which the BCE sends a DW store request to SCE 30 for the update of main storage upon an IE store. When a store request is made by the BCE to SCE, the DW data for the store will be sent down via the data bus in parallel. The SCE should coordinate with each BCE such that a store request from the BCE will always be received in the associated store stack (SS) at the SCE in normal conditions. The cross-interrogate (XI) handling at the SCE by examining the CDs is similar to that described in U.S. Pat. No. 4,394,731.

The IE may issue fetch or SI request with EX intent also as described in U.S. Pat. No. 4,394,731. Such a request can be successfully completed only when the requested DW hits to a cache line with EX bit on. A fetch request with RO intent only requires the line valid in the cache with V bit on. Protection errors and other exceptions in cache access will be handled by special exception logic.

Figure 6A:
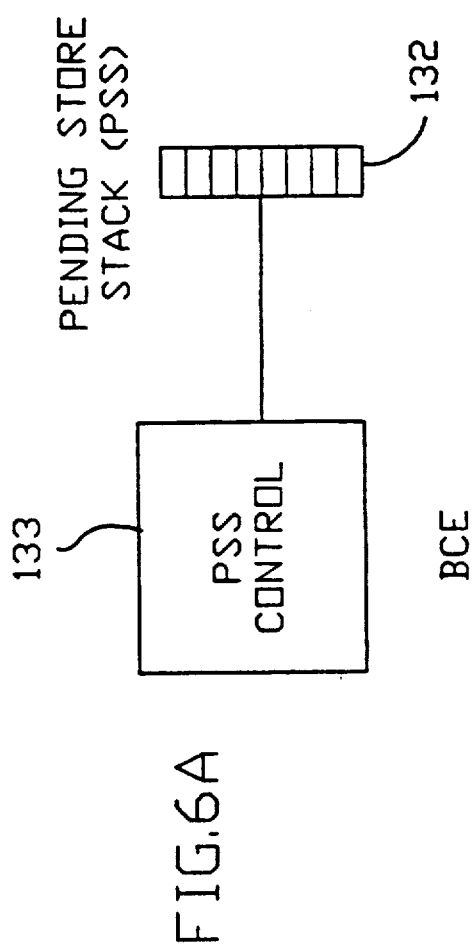
FIG. 6A shows a pending store stack at a BCE.
Figure 6B:
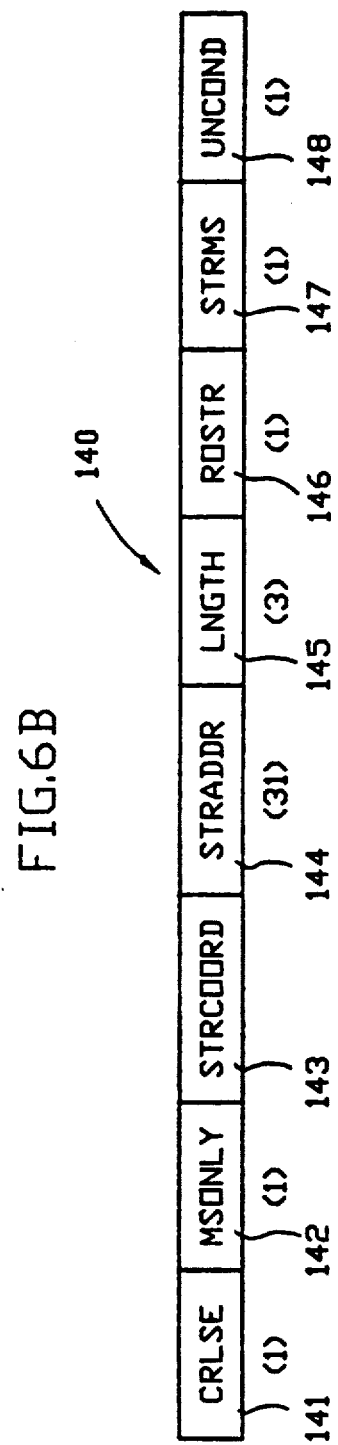
FIG. 6B shows the format of a pending store stack directory entry.

The pending store stack (PSS) 132 at a BCE (for example, 20) is described in FIG. 6A. PSS 132 is implemented as a circular FIFO queue with 8 entries, labelled 0 through 7. Each PSS entry contains DW data for a store issued from IE. FIG. 6B shows the format of a PSS directory entry 140, including their sizes in bits. At each PSS directory entry there are at least four fields: absolute (byte) address field STRADDR (31 bits) 144, data length field LNGTH (3 bits) 145, five flag bits CRLSE (1 bit) 141, MSONLY (1 bit) 142, ROSTR (1 bit) 146, STRMS (1 bit) 147 and UNCOND (1 bit) 148, and a field STRCOORD 143 recording the cache position for the stored DW. LNGTH represents between 1-8 bytes of store data (within a doubleword). When all 3 bits in LNGTH are 0's the store is for a full doubleword, and otherwise it specifies a partial DW store. When CRLSE 141 bit is on, the DW store is under conditional phase and can not be released to main storage. When MSONLY 142 bit is on for a PSS entry, either the store has already been put away to the cache but not yet sent to the main storage, or the store needs not to be put away into the cache (for a full DW store into a line missing in cache). ROSTR 146 indicates a store associated with a currently RO line. STRMS 147 indicates a store that encounters a miss line fetch. UNCOND 148 specifies that the store should be put away into a line only when the EX status has been acquired.

A store from the IE unit may be put on the pending store stack (PSS) 132 when necessary. In case PSS 132 is full upon insertion, the IE unit simply holds its operations till there is room available on PSS in a later cycle. The BCE constantly looks for the first DW in PSS for store putaway, if PSS is not empty at the moment. All the stores in PSS are processed in incoming sequence.

A cache store request from the IE unit contains an additional 5 bits of signals: MSONLY, CRLSE, UNCOND, ROSTR and STRMS. The interpretation of these flag bits is as described for PSS earlier. When a store request from IE is queued on PSS, these five bits and other information are recorded in the corresponding PSS directory.

In the following descriptions we assume that executions can be backed up and restart only at a proper point allowed by a particular implementation. The IE unit has the control to hold execution of certain instructions or data accesses during the conditional phase and to use the UNCOND=1 flag to suppress conditional processing of certain data stores.

At any moment of time, there can be at most one store put away into the cache at a BCE with RO status on the line. The early put away store will remain on the PSS for possible execution back up, and also serves the purpose of blocking any subsequent stores before the EX status is granted. In order to simplify the description of the present invention each BCE is required to not allow more than one outstanding request to be issued to the SCE at any moment, except store releases from PSS to the main storage for finished or unconditionally executed instructions. The following descriptions will also ignore handling for exception conditions.

Figure 7A:
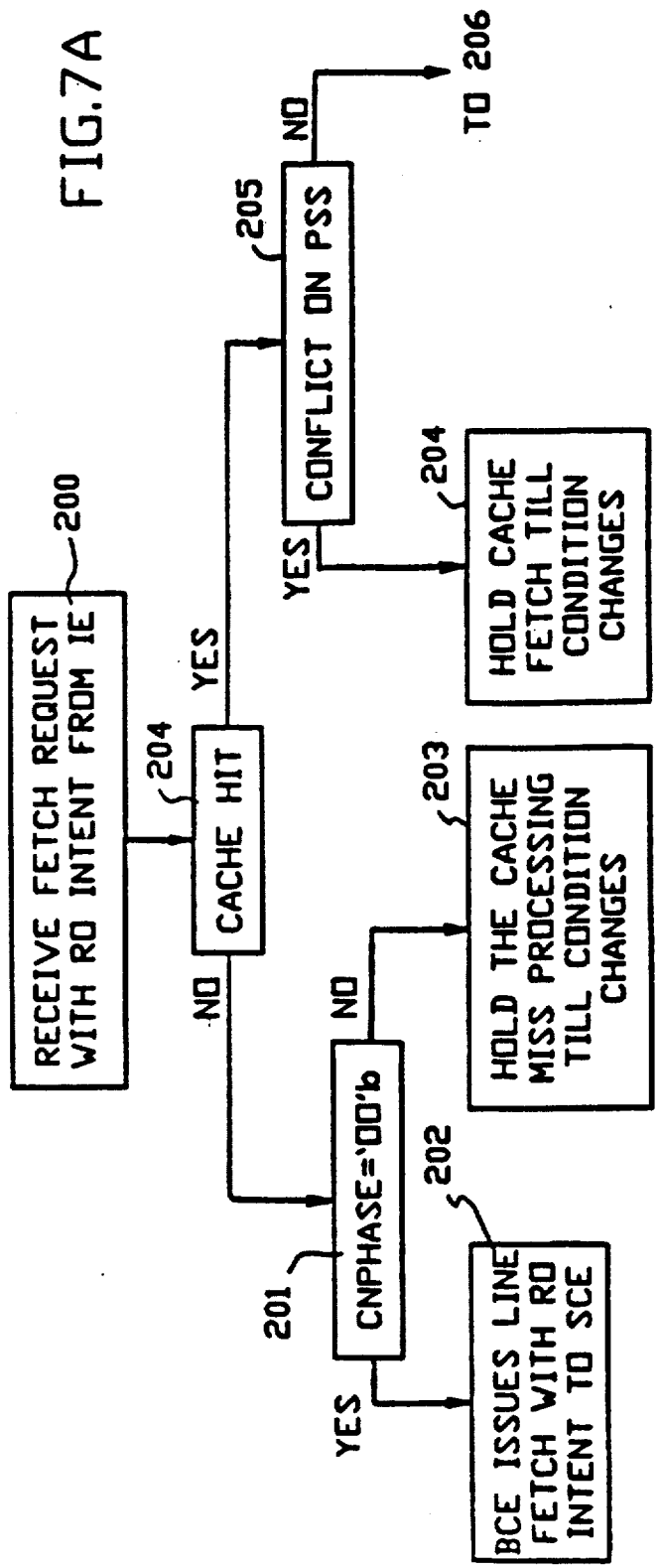

FIGS. 7A and 7B are flowcharts showing BCE handling upon receiving a fetch request (200) with RO intent from the IE unit. For a cache miss (204, 201) the BCE will issue a miss fetch request with RO intent to the SCE (step 202) when possible. If CNPHASE 85 equals '01'b or '11'b (201), the miss fetch will be held till CNPHASE 85 is cleared later (step 203). The IE idles and waits for the missed DW to arrive from MS 50. Upon a cache hit (step 204) the DW is accessed from the cache without delay if it does not conflict with any of the possibly existing DW stores in the PSS (step 205). The detection of such conflict is through operand store compare, which matches the requested fetch DW address against all valid DW address in the PSS with MSONLY=0. A conflict is detected if a match is found, in which case the fetch will be reissued later till the conflict condition disappears. The DW fetch will be read from the cache arrays if there is no conflict (step 211). A special situation is when the DW fetched is at the address recorded in the ROSTRDW 88 register (step 208). In which case the execution will turn into conditional phase by setting CNPHASE 85 to '11'b and clearing CNFETLN 90 stack at the BCE and then recording the line address on the CNFETLN stack, and by properly setting CNFLAG 71 and CNIADDR 72 at the IE unit (step 209). Any instruction with operand fetched when CNPHASE≠'00'b will be treated as conditional and subject to possible subsequent backup (steps 206, 207). When a conditional operand fetch is carried out, with CNPHASE='11'b, the line address is recorded in the CNFETLN 90 stack (step 210).

Figure 7C:
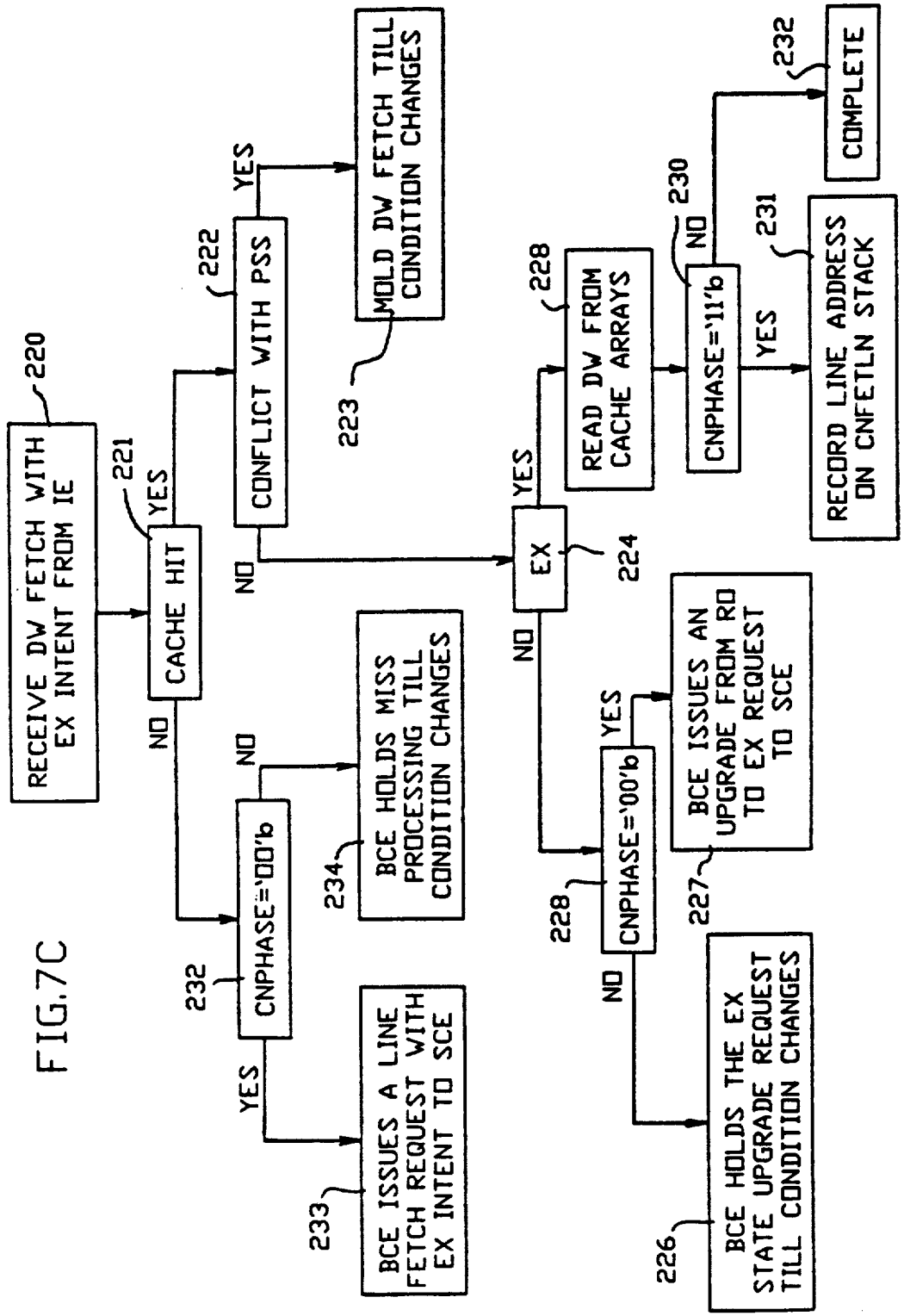
FIG. 7C is a flowchart for BCE handling upon receiving a fetch request with EX intent from the IE unit.

FIG. 7C contains a flowchart for BCE handling upon receiving a fetch request with EX intent from the IE unit (step 220). If the DW hits to an RO line in cache (step 221) the BCE issues a request for EX status to the SCE (step 227) when possible. If the line misses in cache (step 221) the BCE issues a miss fetch request with EX intent to the SCE (step 233) when possible. Such SCE requests are held if conditional execution is in effect (steps 223 and 234). The fetch is held if conflict with pending stores is found during operand-store compare. The fetch is carried out (step 228) without delay if the line is resident in cache (step 221) with EX state (step 224), with the line addressed recorded on the CNFETLN stack. However, when the line is RO the BCE will request EX status from SCE only when CNPHASE='00'b (step 232).

In this embodiment it is assumed that each store interrogate (SI) request the IE unit sends to the BCE is enhanced with an extra signal line STRHIT. When STRHIT=1 the line covering the store DW is required to be in the cache. For instance, a SI request for a partial store will have the STRHIT line raised. FIG. 7D contains a flowchart for BCE handling upon receiving a store interrogate (SI) request from the IE unit (step 240). For a SI request the BCE will check for protection violation. For instance, when the BCE detects a key violation for a SI request, certain exception handling will be in place. In the following we will only describe the procedures for cache directory interrogation. Upon a cache miss (step 241), the SI will complete (step 243) if the STRHIT flag is off in the request (step 242). If the STRHIT flag is raised the BCE will schedule a request for line miss fetch with EX intent to SCE (step 245) if possible. When the miss fetch request is issued to SCE, the BCE also raise its flag bit STRMSFLG(=1) 86 to indicate that the missed line has not come in. The SI request completes (step 251) if the line is EX in the cache (step 250). In case the line is found RO in the cache (step 252) the BCE will hold the request till it is possible to issue a request for upgrade to EX state to SCE (step 254). When the upgrade to EX request is sent to the SCE, the flag ROSTREX 89 at BCE is also set to 0 indicating that the EX status issued has not been granted. In any case, the BCE reply to the issuing IE unit should include tag indicating whether a cache miss or RO line hit is involved. When the SI line is found in the cache the IE also receives the cache coordinate from BCE. The IE unit will then make decision on the actual DW store based on the BCE responce. Note that, in step 245, when STRMSFLG 86 is turned on, the BCE will hold if STRMSFLG=1 86 till it is 0. Similarly, when ROSTREX 89 is turned off (step 254), the BCE will hold till ROSTREX 89 is 0.

Figure 7E:
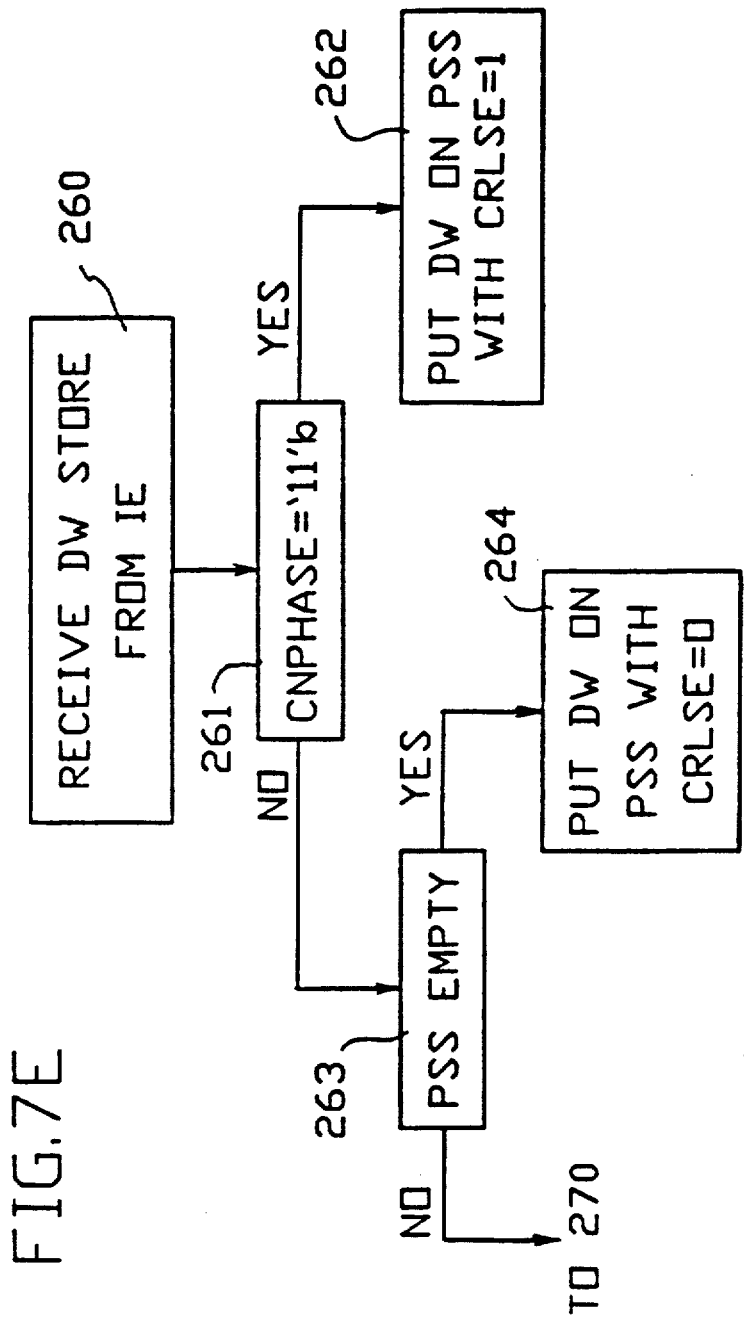
FIGS. 7E and 7F are flowcharts for BCE handling when a store request from the IE unit receives priority.

FIG. 7E contains a flowchart for BCE handling when a store request from the IE unit receives priority (step 260). The store request from IE carries the following flag bits MSONLY, STRMS and ROSTR as determined by the associated earlier SI request, plus the flag bits CRLSE and UNCOND as determined by the IE itself. We assume that, when the IE unit issues an unconditional store (UNCOND=1), it assures that the only situation the store may be held is when the store is to a RO line (ROSTR=1) and the EX status has not been granted by SCE (ROSTREX=0). For a conditional execution, when CNPHASE='11'b (step 261), the DW store is put on PSS (with CRLSE bit on) if possible (step 262). In case PSS is full (step 263) the store will be held by IE till PSS has room available. For a store request with CNPHASE≠'11'b (step 264) the BCE will try to queue the DW store on PSS if there are still other stores pending there, and the store will be held if PSS is full. In case PSS is empty when CNPHASE≠'11'b the BCE will try to carry out the store putaway operations as described in FIG. 7E.

Figure 7F:
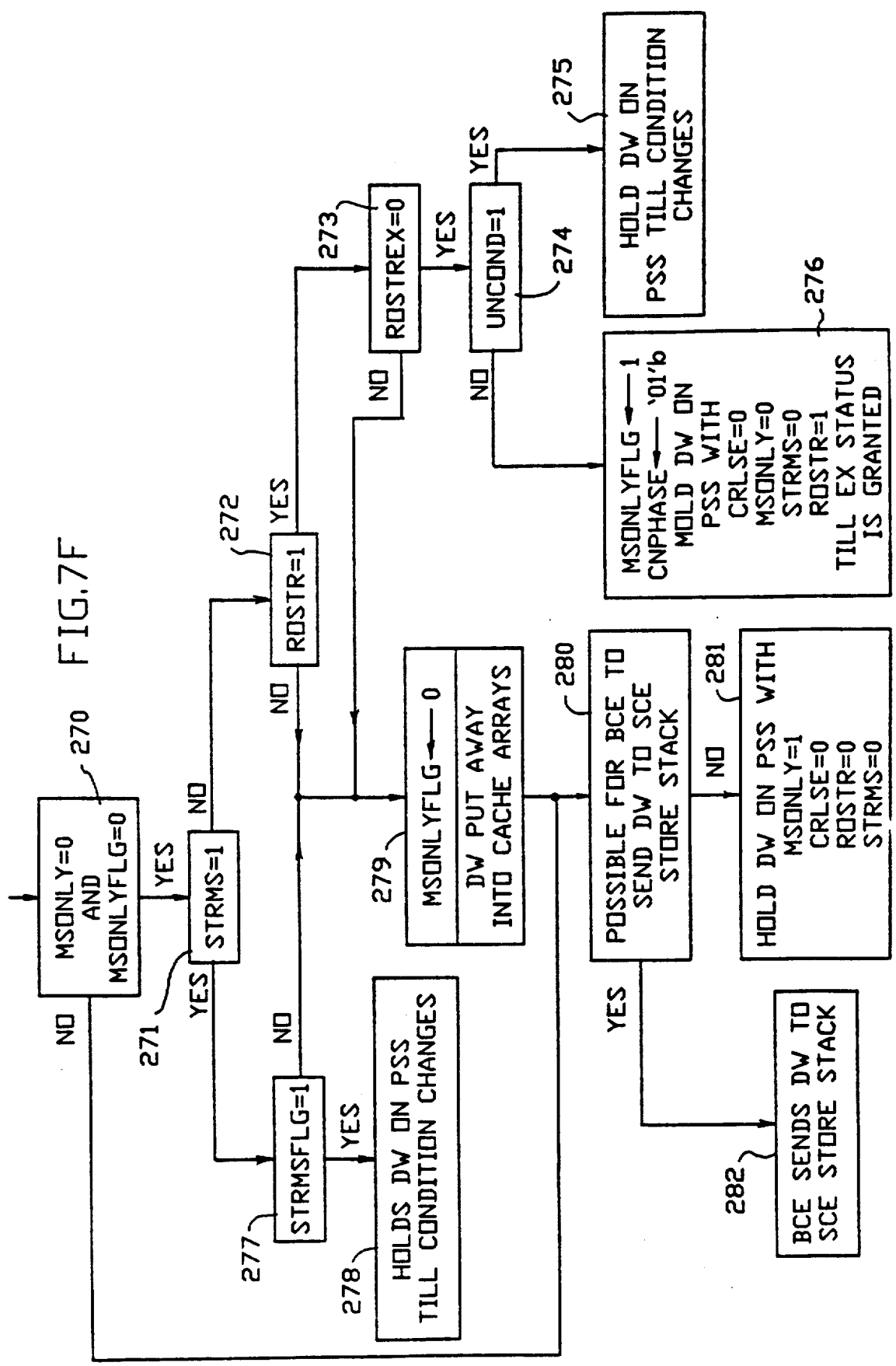

In FIG. 7F the BCE first tests to see whether the store needs to be put away into cache arrays (step 270). If MSONLY=0 and MSONLYFLG=0, indicating the need for cache putaway, the BCE checks whether the store involves a missing cache line (step 271). If so, when STRMS=1 for the store request, and if the line has not yet arrived at the cache (step 277), the store is held on the PSS (step 278) for putaway when the line is in. If the store request does not involve a missed line (step 271) the ROSTR bit is tested for condition of store into a RO line (step 272). If ROSTR=1 and if ROSTREX=0 (step 273), the EX status has not been granted on the line, and the store will be put away into the cache arrays while at the same time it gets queued on the PSS (step 276) except when the store request is unconditional (UNCOND=1, step 275).

If the store is put away into an RO line (step 281) the CNPHASE 85 is set to '01'b and the MSONLY bit will be set as 1. An unconditional store request (UNCOND=1) will not be stored into RO line and will be held on the PSS 84 instead (step 281). If the requested store is ready for putaway into a EX line, the DW is put into the cache (step 279) and the BCE checks whether the DW can be sent to the SCE store stack for MS update (step 280). If the DW cannot be sent to the SCE store stack the DW is held on the PSS with MSONLY bit on till it can be sent out to MS. In case the store request has MSONLY=1 (step 281) at the beginning, the BCE only needs to send it to the MS if possible (step 282).

When the SCE receives a DW store request from CPi the request is simply queued onto the store stack SSi at the SCE. The SCE will constantly update DW stores from the store stacks to main storage when possible.

Other than DW store requests, the SCE may receive three major requests from a BCE. A miss fetch with RO intent requests a cache line transfer from main storage with RO state. A miss fetch with EX intent requests a line transfer from main storage with EX status. The third request type is upgrade to EX status which requests only the EX status for a cache line that is already resident at the BCE with RO state. Many of the conventional SCE design schemes may be applicable to our embodiment. Examples are the SCE designs described in U.S. Pat. No. 4,394,731 and (copending application, Ser.No., filed Dec. 5, 1988 and assigned to the assignee of the present invention). It is assumed that, for a miss fetch request from the BCE, the SCE will perform necessary operations and eventually returns the line with requested state (RO or EX). For an upgrade to EX status request from a BCE the SCE will eventually signals BCE for the granting of the requested EX status. Since the SCE design is not the main focus of the current invention, detailed procedures for SCE operations will not be provided.

The BCE of a CP may receive the following three major signals from the SCE: receive line (with RO or EX status), CERO (change EX to RO status of a line), and line invalidate.

For receive line signal from SCE the BCE processing is quite standard. The BCE gets ready for the incoming data line. The directory entry for the line is validated with the granted status (RO or EX). In a typical design the data comes into the cache a doubleword per cycle. The first DW received is normally the one requested by the IE upon the cache miss, and is bypassed to the IE unit for resumption of execution if it is a fetch miss. Right before the data comes in the BCE may turn off the STRMSFLG 87 flag, which will allow a store miss to be processed when the cache is free for access.

Recall that the STRMSFLG 87 is turned on by BCE during the processing of a SI request when the cache miss is issued to the SCE (step 245, FIG. 7C) and is tested when the BCE processes a store request with STRMS=1 (step 271, FIG. 7E).

Figure 8A:
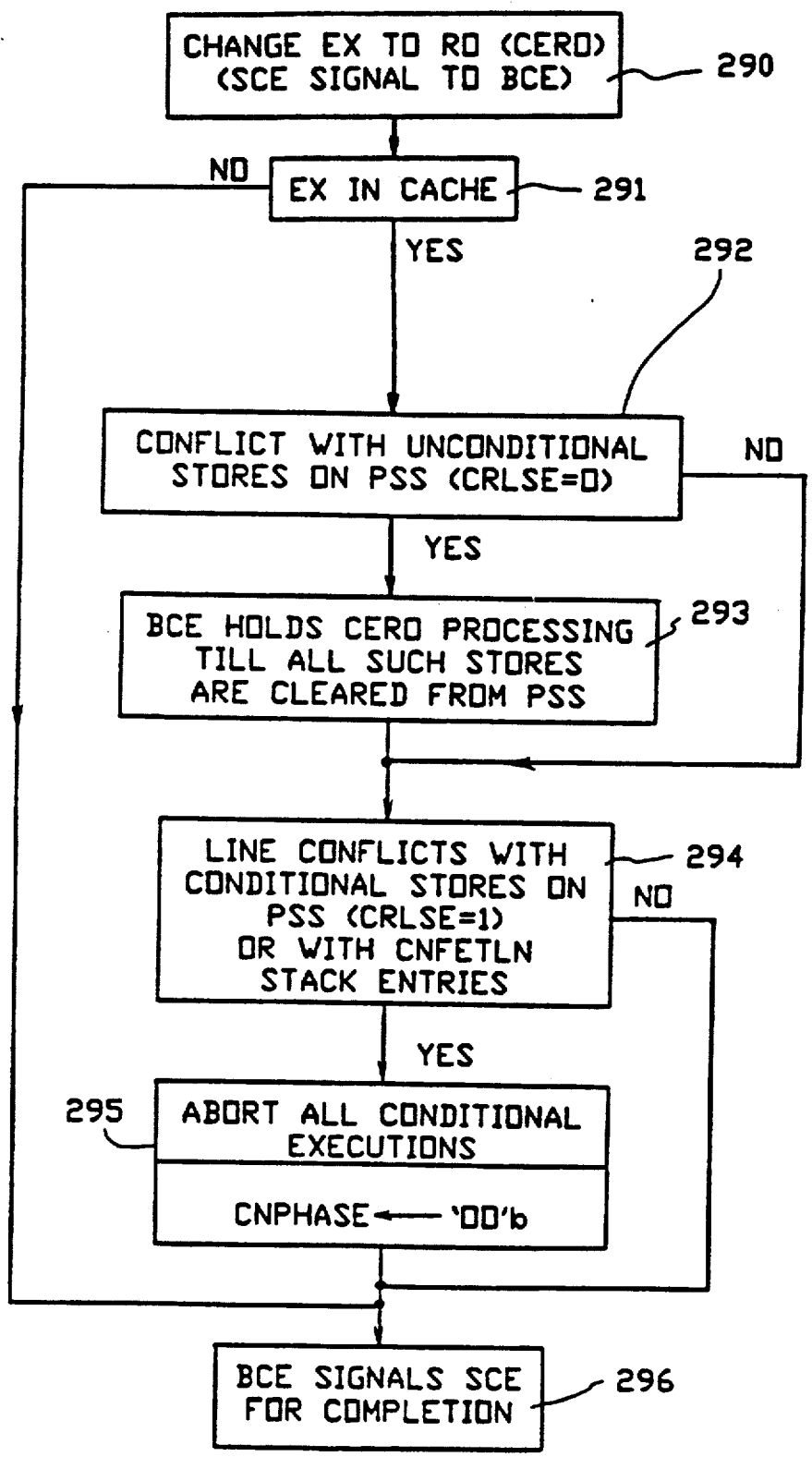
FIG. 8A describes the BCE actions upon receiving a CERO request from the SCE.

FIG. 8A describes the BCE actions upon receiving a CERO request from the SCE (step 290). If the line is either not in cache or is RO in cache (step 291) the BCE reports completion to the SCE (step 296). If the line is still EX in cache the BCE needs to clean up all the possible pending effects before completing the CERO processing. Before the CERO is processed the BCE should make sure that all stores are issued by IE after SI requests. Any store with SI request finished should be issued to PSS first. The BCE then checks for conflict with unconditional stores (CRLSE=0) on PSS (step 292). A conflict is a matching store with DW address covered by the CERO line. All of such conflicting pending stores should be issued to the SCE first (step 293) in order for MS to be updated properly. Then the BCE checks whether there is any conflict with conditional stores (CRLSE=1) pending on PSS (step 294) and have all conditional executions aborted if such conflict is found (step 295). If no conflict with conditional pending stores is found the BCE checks for possible conflicts with operand fetches in conditional executions thru the CNFETLN 90 stack. The conflict is determined (step 294) either when CNFETLN 90 has overflowed or when there is a match of the CERO line address with valid entries in CNFETLN 90 stack, in which case all conditional executions should be aborted (step 295) before SCE is reported of the completion of CERO processing. (Note that the CNFETLN 90 stack is always maintained empty during unconditional execution phase with CNPHASE≠'11'b.)

When the BCE aborts conditional executions it clears out all conditional stores on PSS 84 (with CRLSE=1). The BCE also clears the CNFETLN 90 stack. The BCE signals the IE unit to reset execution status for re-execution starting at the backed up point (at the instruction address recorded in the CNIADDR 72 register) and to resets CNFLG 71 to 0.

Figure 8B:
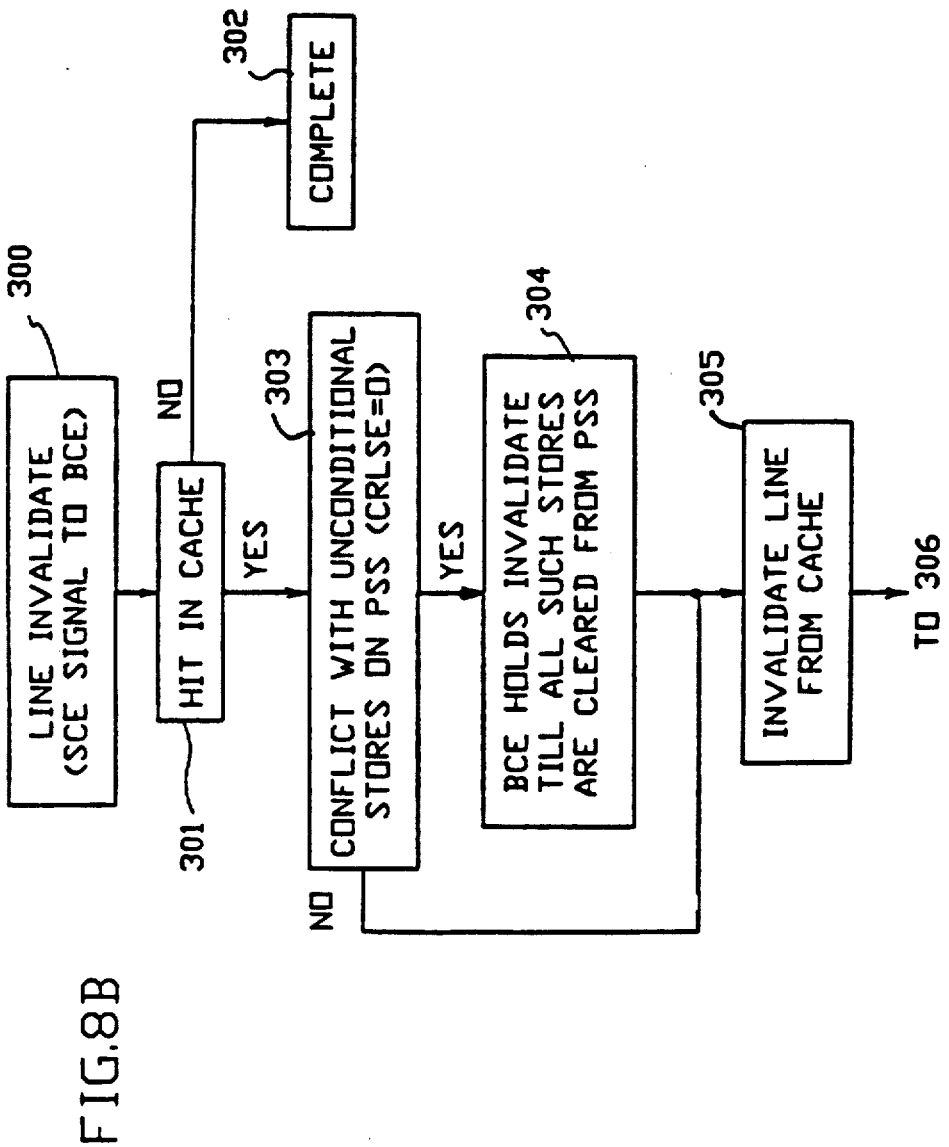

FIGS. 8B and 8C show the BCE actions upon receiving a line invalidate request from the SCE (300). The BCE processing completes immediately (step 302) if the line is not in cache (step 301). Otherwise the BCE clears up all conflicts with unconditional stores on PSS (steps 303 and 304) first as in FIG. 8A. The line entry in the directory is then invalidated (step 305). In case CNPHASE='00'b, in which case there is no store into RO line done, the BCE checks whether the line is EX in cache (step 312). If the line is EX the invalidate processing is complete and the BCE signals SCE for completion of invalidation of the EX line (step 313). In case the line is RO (step 312) the BCE determines whether there is already a request for upgrade to EX status sent out to the SCE for the line being invalidated (step 314). If so, the BCE completes the invalidate processing by issuing request for line fetch with EX intent to the SCE. (Note that, in this situation we assume that the SCE will automatically discard the original request for upgrade from RO status to EX issued from this BCE before.) If CNPHASE='11'b (step 307), indicating the existence of conditional executions, the BCE checks for conflict with conditional stores on PSS (CRLSE=1) and with CNFETLN 90 contents (step 308). When a conflict is found all conditional executions will be aborted (step 309). In any case, if CNPHASE≠'00'b the BCE will check for the possibility of invalidation of the RO line that was stored into by comparing with address in the ROSTRDW 88 register (step 310). If a match is found the BCE needs to issue a line fetch request with EX intent to SCE (step 311). In which case the line fetched will be put into the originally invalidated cache entry. Also the BCE sets MSONLYFLG 87 to 0 and STRMSFLG 86 to 1 (step 311). Setting MSONLYFLG=0 will allow the in order to allow the DW store originally put away into the RO line be put away into the newly fetched EX line later. Recall that, in FIG. 7E, MSONLYFLG 87 is reset to 0 when a store is put away into the cache (step 279) and is set to 1 when a store is put away into a RO line (step 276), and that the test for necessity of cache put away for a store is by checking both MSONLY 142 and MSONLYFLG 87 for 0's (step 270, FIG. 7E). Setting STRMSFLG=1 will allow the DW store be put away into the cache in a manner as a normal store cache miss processing as the EX line comes in from SCE.

Restarting execution involves resetting machine state properly, according to the particular implementation. One simple technique is for the IE to copy the machine state like PSW and GPRs before the conditional execution. Depending upon particular implementations, it is beneficial to hold or abort conditional execution when the complexity of backing up instruction execution or system recovery become undesirable. For instance, the design may forbid conditional executions for serialization instructions like Compare-and-Swap (CS). In the extreme case, the design may not carry out any conditional execution, but simply allows early put away of stores into RO lines (when CNPHASE='00'b) and allows only the first fetch against the DW at address recorded in the ROSTRDW 88 register (when CNPHASE='01'b).

The mechanism described for BCE to monitor potentially dirty operand fetches during conditional executions is through recording line addresses on the CNFETLN 90 stack. It is not necessary to record full line addresses on CNFETLN 90 stack. For instance, only certain partial address bits may be used. It is also possible for BCE to record histories of operand fetching by associating a special CNFETBIT bit for each cache line entry. During conditional execution phase, each operand fetch to a line will cause the corresponding CNFETBIT turned ON. And all the CNFETBIT's are turned off when the conditional execution phase is over. With this design the decision boxes at step 294 (FIG. 8A) and step 308 (FIG. 8B) are replaced with the process of step 320 in FIG. 9.

The description of the embodiment has assumed that conditional executions can be backed up and restarted only at the instruction level. With more sophisticated designs this assumption may be relaxed if an appropriate mechanism can be provided to backup the machine execution state during the middle of an execution for certain instructions involving multiple operand fetches and stores.

Although the invention has been described in terms of MP cache design with RO and EX states, similar concepts and techniques may be applied to store-thru MP caches without EX/RO states to allow early put away of data stores and early operand fetching. Furthermore, the techniques in the invention can also be applied to store-in cache designs to reduce processor delays due to EX status acquisition.

While the invention has been described in its preferred embodiments, it is to be understood that changes in form and details of the above description may be made without departing from the true scope and spirit of the invention.

I claim:

1. A method for storing into a non-exclusive cache line in a multiprocessor system having a plurality of processors, a local cache for each of said processors, and a main storage, said method comprising the steps performed by a computer of:

when execution of a current instruction by one of said processors requires storage into a cache line which is currently held in the cache of said one processor as a non-exclusive cache line, storing into said non-exclusive line while waiting for the status of said non-exclusive line to be changed to exclusive;

provisionally processing subsequent instructions by said one processor while waiting for the status of said non-exclusive line to be changed to exclusive;

simultaneously with said step of storing into said non-exclusive line, requesting that the status for said non-exclusive line be changed to exclusive at said local cache; and redoing any of said provisionally processed instructions which used data fetched from a cache line which becomes invalid before the status of said non-exclusive line is changed to exclusive or which depends upon any said redone instruction.

* * * * *